(12) United States Patent
Blom

(10) Patent No.: US 6,356,688 B2
(45) Date of Patent: *Mar. 12, 2002

(54) ALIGNMENT OF OPTICAL BUILDING ELEMENTS

(75) Inventor: Claes Blom, Skänninge (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/098,516

(22) Filed: Jun. 17, 1998

(30) Foreign Application Priority Data

Jun. 18, 1997 (SE) ................................................ 9702345

(51) Int. Cl.[7] ............................. G02B 6/26; G02B 6/30
(52) U.S. Cl. ............................. 385/52; 385/49; 385/50
(58) Field of Search ............................. 385/49, 50, 52, 385/88, 90

(56) References Cited

U.S. PATENT DOCUMENTS

| | | | | |
|---|---|---|---|---|
| 4,411,057 A | * | 10/1983 | Duda et al. .................... | 438/27 |
| 5,416,867 A | * | 5/1995 | Thorsten et al. ............... | 385/72 |
| 5,535,297 A | * | 7/1996 | Goettsche ...................... | 385/90 |
| 5,727,099 A | * | 3/1998 | Harman .......................... | 385/52 |
| 5,793,914 A | * | 8/1998 | Sasaki .......................... | 385/49 |

FOREIGN PATENT DOCUMENTS

| | | |
|---|---|---|
| EP | 0 717 297 | 6/1996 |
| GB | 91/06022 | 5/1991 |
| SE | 98/26885 | 6/1998 |

* cited by examiner

Primary Examiner—Audrey Chang
Assistant Examiner—Jennifer Winstedt
(74) Attorney, Agent, or Firm—Burns, Doane, Swecker & Mathis, L.L.P.

(57) ABSTRACT

When finely aligning an optical fiber, attached in groove of a carrier, with a surface area of an optical element such as a laser, the plate-shaped carrier is plastically deformed by having suitable tools displace or act on the carrier at the end of the fiber, within a deformation region. For facilitating the plastic deformation, slots are made around the deformation region, so that a weakened area is obtained quite at the end surface of the fiber. The fine alignment can be made either for correcting the position of erroneously mounted optical building elements or for a fine alignment of building elements, which have been mounted without necessarily trying to achieve a very high accuracy. The alignment procedure can be executed while simultaneously measuring the efficiency of the interface, by activating the laser to emit light into the optical fiber. This light can be detected by a light detector, so that the deformation process can be made in order to obtain maximum output power at the end of the fiber. The material of the carrier can be a metal having a high degree of purity, for example copper plate of a small thickness. The fine alignment procedure as described provides advantages both in economy and in the degree of accuracy in the alignment operation, so that little attenuation is obtained in the interface between the building elements in the finished product. The carrier may be molded together with the building elements into a capsule in order to obtain an optical component suited to be mounted on a circuit board.

26 Claims, 2 Drawing Sheets

ALIGNMENT OF OPTICAL BUILDING ELEMENTS

BACKGROUND

Alignment of an end of an optical fiber in relation to the output aperture of a laser chip must be made with a large accuracy in order to avoid optical losses when light is emitted from the laser which is to propagate along the fiber. The high accuracy raises the corresponding requirements on the assembly process, in particular when mounting the fiber at the appropriate position at the chip. Methods have been used for lowering the requirements on the accuracy when mounting the components such as using a method including a so called "tapered" laser which has a mode field that is adapted to be used for coupling to for example a single mode optical fiber.

In existing assembly methods generally some kind of carrier is provided on which the optical fiber and the laser element in the shape of a chip are mounted. This carrier can be provided with different alignment means such as V-grooves, other types of grooves and furthermore accurately defined projections or bosses. Such a carrier can be produced as a silicon plate having anisotropically etched V-grooves produced therein and different layers deposited on the plate in order to form support surfaces, against which a chip can be accurately positioned.

In order to position an optoelectric chip on an intended place on the carrier also surface tension forces in molten solder areas, for example molten, small solder balls, which attach and possibly also electrically connect the chip to the carrier can be used, what can give a high accuracy when mounting a chip. Such a process requires great care when used and can therefore have limitations in obtaining a sufficiently high yield of correctly mounted components such as in demanding applications or in order to obtain a fabrication with a sufficient pay-off. The process depends on some delicate factors such as that the thickness of deposited solder should be maintained at a very constant value and that the areas which are wettable by the molten solder are accurately defined both on a chip and on the carrier.

Methods have been proposed using plastically deformable supports for the optical device or the optical fiber, the supports being deformed to making a final positioning or alignment of the fiber end in relation to the optical device. Thus, in the published International patent application WO 91/06022 a lens mount for a miniature optical lens is disclosed, the lens mount comprising a flat frame standing up from a base. The frame surrounds the portion where the lens is mounted and is capable of plastic deformation by bending the frame to an aligned position of the lens. Such a frame structure is not suited for aligning waveguides in or at a flat base with an optical component in a chip rigidly attached to the base. In addition the frame structure is space-consuming in the vertical direction.

Furthermore, in the published European patent application 0 717 297 fine alignment of an optical fiber with a laser chip is disclosed, using an elongate support member for retaining the fiber end. The support member has the shape of a cylinder rod comprising a longitudinal slot in which the fiber is held. The cylinder member is maintained at some distance from the base plate by a plastically deformable saddle having arms standing up from the base plate. The saddle arms can be deformed allowing a repositioning of the fiber end. This device is not well suited for finely moving a waveguide in or at a base plate into alignment with an opening of an optical component rigidly attached to the base. In addition the device is complicated and requires a plurality of mounting steps.

SUMMARY

It is an object of the invention to provide a method and a carrier for optical building elements allowing an alignment of a surface area of an optical building element with a surface area of another optical building element.

It is a further object of the invention to provide a method and a carrier for optical building elements allowing an alignment of a surface area of an optical building element with a surface area of another optical building element using no extra mounting or attachment devices and thus not adding to the height of the total optical component.

It is a further object of the invention to provide a method and a carrier for optical building elements in an optical component allowing an alignment of input and output areas of the building elements with each other while simultaneously making a measurement of the feed-back type in order to obtain a maximum transmission between outputs and inputs.

The problem to be solved by the invention is how a good alignment between different optical building elements on a common carrier can be achieved. The problem comprises both achieving a fine alignment of for example optical components, which when finally tested have been decided to be erroneously mounted with an unsatisfactorily accuracy, and allowing a final, corrective alignment of the building elements in relation to each other, so that in the previous assembly process only a lower accuracy has to be maintained and thus a less costly assembly method can be used. Also, the problem comprises how a fine alignment can be made in a simple and space-consuming way.

An alignment method, which can also be called a final alignment method, is based on plastic deformation of a suitable material. This material is incorporated in a plate-shaped carrier for optical building elements and the material of the carrier is thus to be selected so that it is plastically and mechanically deformable having a minimum elastic regression or spring back after a deformation having been made. The material should also be such that it is not influenced by subsequent steps when manufacturing an optical component, in particular not influenced by the sometimes rather high temperatures which can be required for example for curing encapsulating plastic or artificial resin materials. This condition can also be worded in the way that the material should have substantially no mechanical memory. The carrier can be made of copper plate having a high degree of purity, e.g. containing at least 99 per cent (wt.) of copper.

The carrier is configured so that it by means of exterior pressing surfaces can allow that certain portions, for example inner portions, of the carrier are displaced in different directions. In the case where an optical fiber attached to the carrier is to be aligned, appropriate portions of the carrier need to be displaced only in directions perpendicular to the longitudinal direction of the fiber. This deformation of the carrier can be executed after mounting different building elements thereon and it is further possible to measure the optical transmission between the different building elements attached to the carrier and to control the deformation of the carrier using feed-back so that a maximum optical transmission having thus a minimum attenuation is obtained between the inputs and outputs of the different optical building elements. The same method can also be used for producing a selected attenuation at the interface between two building elements in those cases where such an attenuation is desired, e.g. for adapting the input power to some light detector or light amplifier. The method can be generally described in the way that losses in the interface between two optical building elements, for example an optical fiber and a laser, can be measured during the alignment procedure, provided that one of the building elements is supplied with a suitable signal, for example by providing suitable electrical currents and voltages to a laser, so that it emits a light signal.

The carrier can be configured as a plate having suitably placed slots around that area of a building element which may have to be displaced in order to obtain a correct accurate alignment with another building element. The slots can for example have their longitudinal direction substantially perpendicular to those surfaces which are to be placed opposite each other and which in addition in a previous assembly procedure have been placed as close to or against each other as possible. The slots should also have portions extending in parallel to said areas and up to a region close thereto, so that a narrow region is formed in the vicinity of the surfaces, which region serves as weakened area and facilitates the deformation. Such slots will permit a displacement perpendicular to the plane of the carrier.

Additional objects and advantages of the invention will be set forth the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
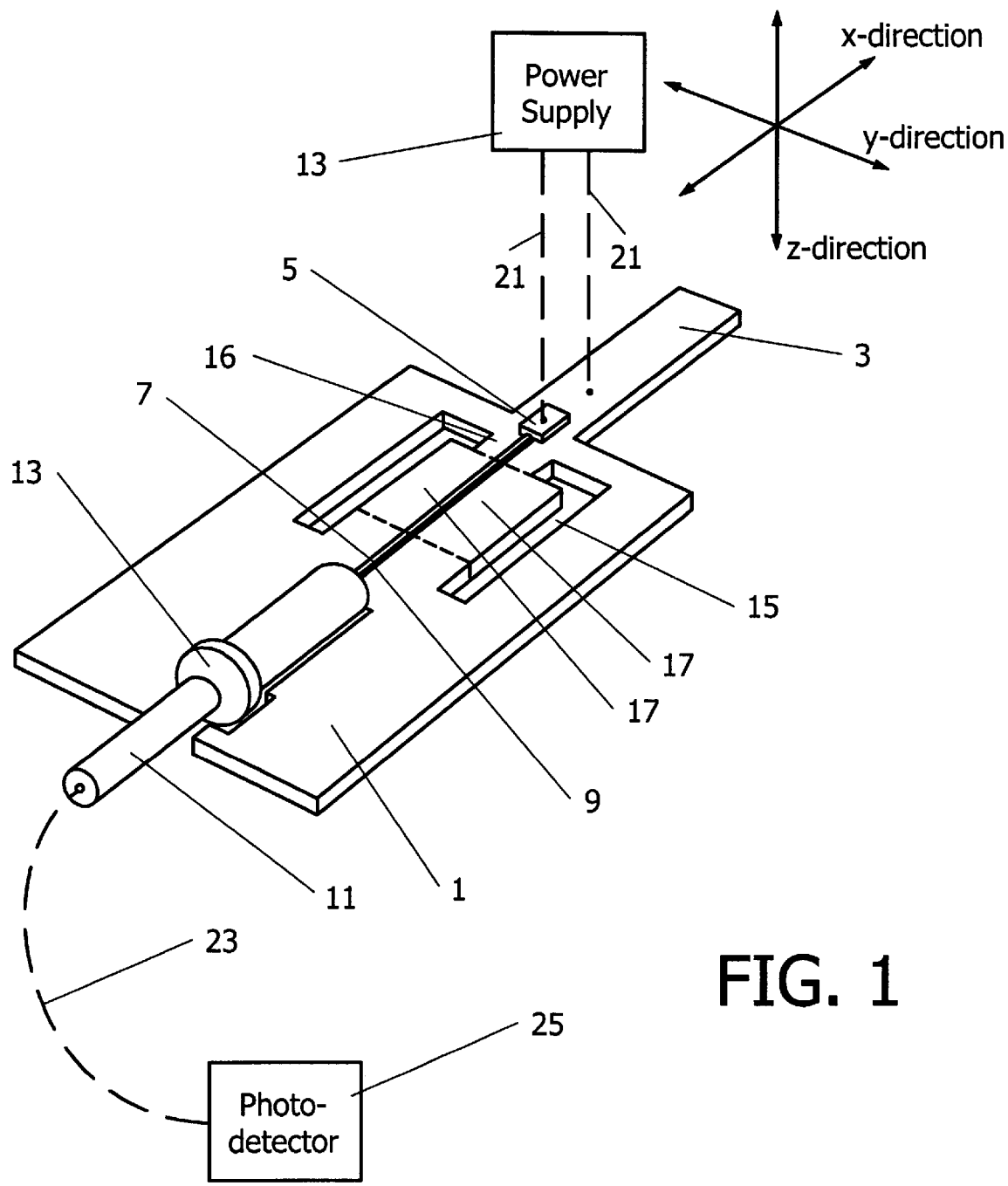
FIG. 1 is a perspective view of a carrier plate having an optical fiber and a laser chip mounted thereon.

In FIG. 1 a carrier 1 is shown, which is made of a plate or sheet of a metal at least at some portion of which is plastically deformable. The carrier 1 has a generally rectangular shape comprising a projection 3 at one of its short sides. On the top surface of the projection 3 a laser chip 5 is mounted having its output surfaces directed towards the rectangular main portion of the carrier 1. At the longitudinal centre line of the rectangular portion of the carrier 1 an optical fiber 7 is placed which thus extends in parallel to the long sides of the rectangular portion and is located in a V-groove 9 embossed or pressed in the carrier 1. The V-groove 9 can be produced according to the method described in the International patent application No. PCT/SE97/02084. The optical fiber 7 is attached in the V-groove 9 by means of a suitable adhesive, e.g. an epoxy adhesive. At its other end the optical fiber 7 is attached in a ferrule 11 which is a cylindrical element made of a suitable material which is non-transparent to the wavelengths, which are to be transmitted in the fiber, the material for example being a ceramic. The cylindrical ferrule 11 projects from that short side of the rectangular portion of the carrier 1 which is opposite the short side at which the projection 3 is located. Suitable V-grooves and recesses are provided for positioning the ferrule 11 on the carrier 1 and a flange 13, located at that inner end of the ferrule, which is located close to the carrier 1.

The optical fiber 7 typically has, when it has been rid of exterior protective polymer sleeves, an exterior diameter of 0.125 mm and its inner end has its end surface placed at an output aperture of the laser 5, which in the illustrated embodiment consists of a small rectangular chip having a thickness of e.g. 0.1–0.4 mm. At the portion of the fiber end, which is closest to the laser 5, L-shaped slots 15 in the carrier 1 are provided, the longer portions of which are parallel to the longitudinal direction of the fiber 7 and the shorter foot portions of which extend up to a region close to the fiber 7 and thus close to the V-groove 9 and also close to the end surface of the fiber 7 at the laser 5. In this region of the carrier 1 which is close to the inner surface of the fiber 7 thereby a weakening 16 of the carrier 1 is obtained.

An xyz-coordinate system is drawn in FIG, 1 having its x-axis in the longitudinal direction of the fiber 7, its y-axis perpendicular to the longitudinal direction of the fiber 7 and parallel to the surface of the carrier and its z-axis perpendicular to this surface and to the longitudinal direction of the fiber 7.

Figure 2:
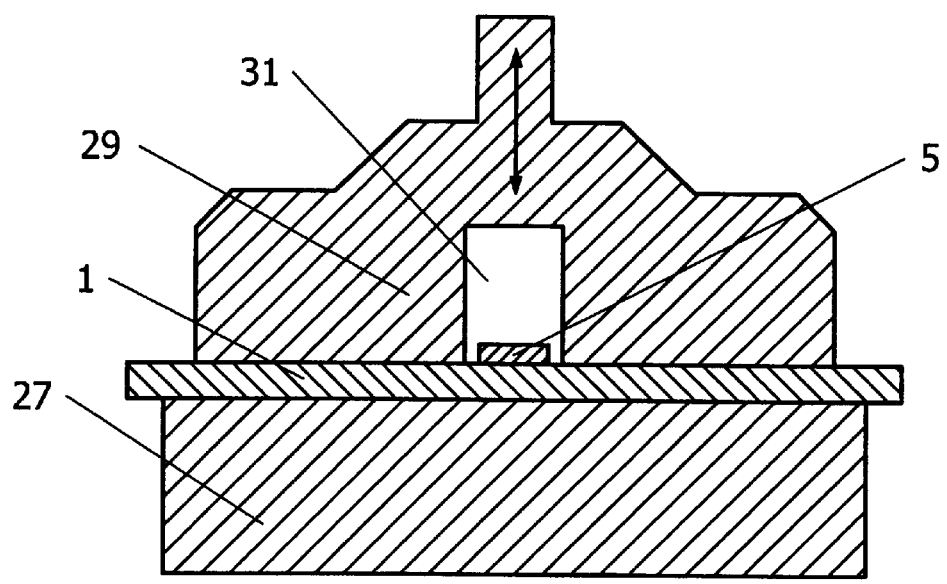
FIG. 2 is a sectional view of the carrier plate and the laser placed in an alignment tool.
Figure 3:
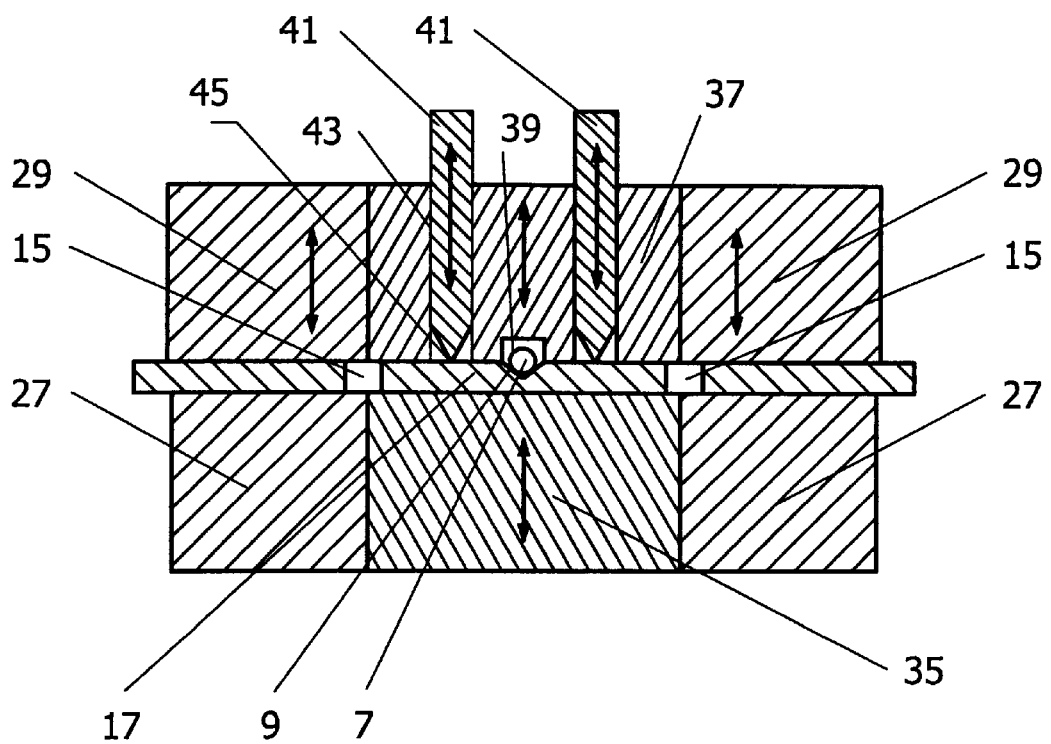
FIG. 3 is a sectional view of the carrier plate and the optical fiber placed in the alignment tool.

It can e.g. be assumed that the laser 5 has been mounted by means of the procedure described above which employs surface tension forces of molten solder in order to bring the very small laser chip 5 to its correct position. However, as has been described above, the relative position of the laser element 5 and of the optical fiber 7 can have an unsatisfactory accuracy and then a final adjustment must be made. Therefor, the regions 17 of the carrier which are positioned close to the inner end of the fiber 7, at the interface to the laser 5 and between the slots 15, are deformed. The carrier 1 having the optical fiber 7 and the laser 5 mounted thereon is inserted in a tool, cross-section 1 of which are illustrated in FIGS. 2 and 3. The tool comprises a stationary base 27 having a flat support surface against which the major part of the carrier 1 rests, except the area at the ferrule 11 and its flange 3 and the region 17 between the slots 15, where the support surface of the base 27 has recesses or through-holes. The carrier 1 is retained at the base 27 by support surfaces which are located in the same plane and belong to an upper locking part 29. The locking part presses the carrier 1 downwards against the base 27 and has recesses corresponding to those of the base and in addition a recess 31 for the laser 5 and a recess 39 for the optical fiber 7. The laser 5 and the optical fiber 7 are thus not touched by any part of the tool. The lower surface of the carrier 1 is thus flat whereas the portions of the carrier 1 close to the inner end of the fiber 7 are free, such as the particular region 17 between the slots, are not touched by any support surface of the base 27 and the locking part 29.

The tool is further provided with different deformation parts or deformation heels, which can be moved by force and in a controlled way. A lower deformation heel 35 is movable vertically (in the z-direction) in a bore in the base 27 located below the region 17 of the carrier. The lower deformation heel has an upper flat support surface which can act on all of said free region 17 of the carrier 1 for an accurate displacement thereof upwards. A corresponding upper deformation heel 37 is movable in the same way vertically in a corresponding bore in the locking part that is located above the particular region 17. It has a lower flat support surface, in which the recess 39 is provided for the optical fiber, so that it is not touched by any surface of the upper deformation heel 37. The support surface of this heel can then act on the particular region 17 for an accurate displacement thereof downwards, so that in that case the lower deformation heel 35 can at the same time be moved in the downward direction or it has previously been moved somewhat downwards in order to give space for the movement of the upper heel. The corresponding conditions apply when moving the lower heel upwards, A positioning of the end of the fiber 7 to an arbitrary desired position in the height direction or z-direction can thus be made.

The end of the fiber 7 can also be moved laterally, i.e. in the y-direction, by means of lateral displacement parts 41. Such a lateral displacement part 41 is provided on each side of the optical fiber 7 and is movable in slots 43 in the upper deformation heel 37. The lateral displacement parts have at their lower regions a pointed shape as seen in a cross-sectional view including lower edges 45, which extend in parallel to the longitudinal direction of the fiber 7 and can act on the particular region 17. When displacing the fiber 7 laterally first the lower and upper deformation heels 35, 37 are set in such positions in the height direction that the region 17 is certainly well restricted against movements upwards and downwards but still is not rigidly retained. Then one of the lateral displacement parts 41 is moved downwards, so that its edge 45 forms a groove in the upper surface of the carrier, in substantially the same way as the V-groove 9 has previously been formed. Then the material in the particular region 17 is moved away from the contact surface with the edge 45 and then thus also moves the optical fiber 7 attached to the carrier in the y-direction, away from the edge in the direction towards the other, opposite laterally displacement part 41. The deformation heels 35, 37 can earlier have displaced the fiber 7 in the vertical direction so that its end surface at the laser 5 is located in the intended height position. Alternatively, the vertical displacement can also be made after the horizontal one, or also alternatingly therewith in small steps in order to obtain a correct alignment, for example by means of a measurement procedure using feedback as will be described hereinafter.

Thus, a measurement of the transmission or equivalently a measurement of the losses at the interface between the laser 5 and the end surface of the optical fiber 7 during the alignment procedure can be made in a simple way. Therefor the laser 5 is connected to an electric current source 19, for example by probe lines 21, see FIG. 1. The optical fiber 7 is through the ferrule 11 and an optical fiber, which is indicated by the dashed line 23, connected to a light detector 25 providing for example a signal indicating the power of received light. The light power is evaluated and is provided to for example control means, not shown, acting on the deformation heels 35, 37 and the lateral displacement parts 41 in order to move the end surface of the optical fiber 7 to a position where a maximum transmission is obtained. Owing to the nature of the material of the carrier 1 no elastic regression is obtained but the set position is maintained accurately during subsequent processing steps. The adjustment tool which is used in the procedure as described above can naturally be operated manually by an operator, wherein then e.g. a gauge is observed indicating the light power transmitted from the laser 5 or an automatic equipment, not shown, can be used, which is provided with suitable control algorithms for optimizing the adjustment.

A suitable material of the carrier 1 is copper plate having a high degree of purity including only non-significant contents of other substances, e.g. 0.5 per cent (wt.) zirconium, in order to contain e.g. at least 99 percent (wt.). A suitable thickness of such a copper plate can be 0.2 mm but copper plates of this quality having thicknesses within the interval of 0.15 -0.6 mm are suited for the alignment procedure described above. The copper plate should be softened (annealed) before the deformations, for example before the earlier process step during which the V-groove 9 for the fiber 7 is produced. Only the portion of the plate at the particular region 17 has to be softened in order to allow the alignment as described herein.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of aligning a surface area of a first optical building element with a surface area of a second optical building element, comprising the steps of:

selecting a material which when deformed behaves substantially plastically and with only an insignificant elastic regression, producing a substantially flat plate-shaped carrier of the material, mounting the first optical building element directly on a first portion of a mounting region of a large surface area of the carrier and the second optical building element directly on a second portion of the large surface area with a first alignment between the surface area of the first optical building element and the surface area of the second optical building element, the mounting region being a contiguous area of the carrier having no holes, and thereupon bringing a tool surface in mechanical contact only with at least one area of the carrier located at a side of the first portion of the mounting region carrying the first building element to deform only the at least one area and displace the first portion, thereby displacing the surface area of the first optical building element in relation to the surface area of the second optical building element so that a fine alignment of the surface area of the first optical building element with the surface area of the second optical building element is achieved.

2. The method of claim 1, wherein, in the step of bringing the tool surface in mechanical contact with the carrier, the tool surface is brought in contact with areas of the carrier located at two opposite sides of the first portion.

3. The method of claim 1, comprising the additional step of producing, in the carrier, through-holes at or around or partly around the first portion of the mounting region.

4. The method of claim 3, wherein the through holes are produced as slots.

5. The method of claim 3, wherein, in a case where the first optical building element is an optical fiber having a longitudinal direction and in the step of producing the through holes, the through-holes are made as slots extending substantially in parallel to the longitudinal direction of the optical fiber.

6. The method of claim 3, wherein, in the step of producing the through-holes, the through-holes are made to produce a weakened area of the carrier located at the first portion of the mounting region.

7. The method of claim 1, further comprising the steps of:
pressing a V-groove in the surface of the carrier between the first and second portions of the mounting region, and
mounting an optical fiber, being the first optical building element, in the V-groove.

8. The method of claim 1, further comprising the steps of:
plastically deforming the at least one area in a direction perpendicular to the surface area of the carrier by
bringing a lower deformation heel of the tool surface into contact with a lower surface of the at least one area of the carrier;
bringing an upper deformation heel of the tool surface into contact with an upper surface of the at least one area of the carrier; and
moving the lower and upper deformation heels in a same direction perpendicular to the surface area of the carrier to achieve a fine height alignment of the first optical building element with the second optical building element.

9. The method of claim 8, wherein the moving of the lower and upper deformation heels occurs in one of a simultaneous and a successive manner.

10. The method of claim 8, further comprising the steps of:
plastically deforming the at least one area of the carrier in a direction parallel to the surface area of the carrier by
positioning the lower and upper deformation heels whereby the at least one area of the carrier is restricted against movement in the direction perpendicular to the surface area of the carrier, but not rigidly retained;
bringing an edge of a first lateral deformation part of the tool surface into contact with the upper surface of the at least one area of the carrier on a first side of the first optical building element;
bringing an edge of a second lateral deformation part of the tool surface into contact with the upper surface of the at least one area of the carrier on a second side of the first optical building element; and
moving one of the first and second lateral deformation parts downward into the upper surface of the at least one area of the carrier to move the first optical building element toward the other lateral deformation part, whereby a fine lateral alignment of the first optical building element and the second optical building element is achieved.

11. A carrier for mounting optical building elements having surface areas to be aligned with each other, the carrier having substantially the shape of a flat plate or a sheet and the carrier being at least partly formed of a material which is plastically deformable having only an insignificant or negligible elastic regression, the carrier further comprising a first portion of a mounting region of a large surface area of the carrier capable of supporting a first optical building element, a second portion of the mounting region capable of supporting a second optical building element, and a V-groove pressed or drawn in the carrier between the first and second portions of the mounting region, the V-groove being intended for attaching the first optical building element being an optical fiber to the carrier, whereby upon bringing a tool surface in mechanical contact only with at least one area of the carrier located at a side of the first portion of the mounting region, the first portion is displaced in relation to the second portion so that a fine alignment of the first optical building element and the second optical building element is achieved.

12. The carrier of claim 11, further comprising through-holes made in the carrier in at least one of an area near the first portion of the mounting region, around the first portion of the mounting region, and partially around the first portion of the mounting region.

13. The carrier of claim 12, wherein the through-holes comprise slots extending substantially parallel to a longitudinal direction of the optical fiber capable of being mounted on the carrier in the V-groove.

14. The carrier of claim 12, wherein the through-holes are located for producing a weakened area at the surface area of one of the optical building elements.

15. The carrier of claim 11, wherein the carrier is copper plate having a high degree of purity.

16. The carrier of claim 15, wherein the copper plate contains at least 99 per cent (wt.) of copper.

17. The carrier of claim 11, A further comprising:
a lower deformation heel of the tool surface for contacting a lower surface of the at least one area of the carrier; and
an upper deformation heel of the tool surface for contacting an upper surface of the at least one area of the carrier;
wherein moving the lower and upper deformation heels in a same direction perpendicular to the surface area of the carrier achieves a fine height alignment of the first optical building element with the second optical building element.

18. The carrier of claim 17, wherein the moving of the lower and upper deformation heels occurs in one of a simultaneous and a successive manner.

19. The carrier of claim 17, further comprising:
a first lateral deformation part of the tool surface having a corresponding edge for contacting the upper surface of the at least one area of the carrier on a first side of the first optical building element; and
a second lateral deformation part of the tool surface having a corresponding edge for contacting the upper surface of the at least one area of the carrier on a second side of the first optical building element;
wherein moving one of the first and second lateral deformation parts downward into the upper surface of the at least one area of the carrier moves the first optical building element toward the other lateral deformation part, whereby a fine lateral alignment of the surface area of the first optical building element and the surface area of the second optical building element is achieved.

20. An optical component comprising a carrier having substantially the shape of a flat plate, the optical component further comprising first and second optical building elements which have surface portions aligned with each other, the first optical building element being mounted directly on a first portion of a mounting region of a large surface of the carrier, the second optical building element being mounted directly to a second portion of the mounting region, and the carrier being formed of a material which is plastically deformable having only an insignificant or negligible elastic regression, the carrier having at least one deformation area located at a side of the first portion of the mounting region carrying the first building element, whereby upon bringing a tool surface in mechanical contact only with the at least one deformation area, the first portion is displaced in relation to the second portion so that a fine alignment of the first optical building element and the second optical building element is achieved.

21. The optical component of claim 20, wherein the carrier comprises a V-groove pressed in the surface of the carrier between the first and second portions of the mounting region and an optical fiber being the first optical building element attached in the V-groove.

22. The optical component of claim 21, wherein the carrier has slots located at the at least one deformation area, the slots being parallel to a longitudinal direction of the optical fiber.

23. The optical component of claim 20, wherein the carrier has through holes located at the at least one deformation area.

24. The component of claim 20, further comprising:
a lower deformation heel of the tool surface for contacting a lower surface of the at least one deformation area; and
an upper deformation heel of the tool surface for contacting an upper surface of the at least one deformation area;
wherein moving the lower and upper deformation heels in a same direction perpendicular to the surface of the carrier achieves a fine height alignment of the first optical building element with the second optical building element.

25. The component of claim 24, wherein the moving of the lower and upper deformation heels occurs in one of a simultaneous and a successive manner.

26. The component of claim 24, further comprising:
a first lateral deformation part of the tool surface having a corresponding edge for contacting the upper surface of the at least one deformation area on a first side of the first optical building element; and a second lateral deformation part of the tool surface having a corresponding edge for contacting the upper surface of the at least one deformation area on a second side of the first optical building element;

wherein moving one of the first and second lateral deformation parts downward into the upper surface of the at least one area of the carrier moves the first optical building element toward the other lateral deformation part, whereby a fine lateral alignment of the surface area of the first optical building element and the surface area of the second optical building element is achieved.

* * * * *